United States Patent [19]

Gandrud

[11] Patent Number: 4,522,340

[45] Date of Patent: Jun. 11, 1985

[54] GRANULAR MATERIAL APPLICATOR WITH SPEED COMPENSATOR

[75] Inventor: Dale E. Gandrud, Owatonna, Minn.

[73] Assignee: Gandy Company, Owatonna, Minn.

[21] Appl. No.: 509,658

[22] Filed: Jul. 1, 1983

[51] Int. Cl.³ .............................................. A01C 15/04
[52] U.S. Cl. ..................................... 239/654; 406/65; 406/135; 222/617; 222/618; 222/238; 222/311
[58] Field of Search ............... 222/617, 614, 623, 624, 222/625, 238, 271, 272, 311, 312, 316, 317, 410, 414, 630, 618; 111/36, 77, 78, 34, 73; 239/655, 654; 406/63, 65, 123, 135

[56] References Cited

U.S. PATENT DOCUMENTS

| | | | |
|---|---|---|---|
| 2,784,881 | 3/1957 | Hines et al. | 222/623 |
| 3,128,921 | 4/1964 | Henderson | 222/238 |
| 3,240,401 | 3/1966 | Kirschmann | 222/272 |
| 3,633,331 | 1/1970 | Reichlin | 222/414 |
| 4,296,695 | 10/1981 | Quanbeck | 239/654 |

FOREIGN PATENT DOCUMENTS

| | | | |
|---|---|---|---|
| 2212769 | 9/1973 | Fed. Rep. of Germany | 111/77 |
| 2289103 | 5/1976 | France | 239/655 |

Primary Examiner—H. Grant Skaggs
Attorney, Agent, or Firm—Merchant, Gould, Smith, Edell, Welter & Schmidt

[57] ABSTRACT

The specification discloses an applicator (10) for precisely dispensing granular materials, such as herbicides, pesticides and the like, with improved control while compensating for the speed and travel direction of the implement carrying the applicator. The applicator (10) comprises a hopper (14) with an arcuate hopper bottom extension (40) and an internal feed rotor (42). The arcuate hopper bottom extension (40) is preferably inclined, and the openings (44) in the end preferably include straight lowermost sides oriented parallel to the rotational axis of the feed rotor (42) to obtain better flow control in conjunction with a revolving transfer means (54) located beneath and closely adjacent to the bottom end of the hopper. The revolving transfer assembly (54) preferably includes a plurality of rollers (56) for individually receiving material from the openings (44) in the hopper and distributing it for application. The feed rotor (42) and transfer assembly (54) are vertically and laterally offset and are interconnected for counter rotation in unison responsive to travel of the applicator (10) such that the rate of material application is directly proportional to the speed of travel.

12 Claims, 5 Drawing Figures

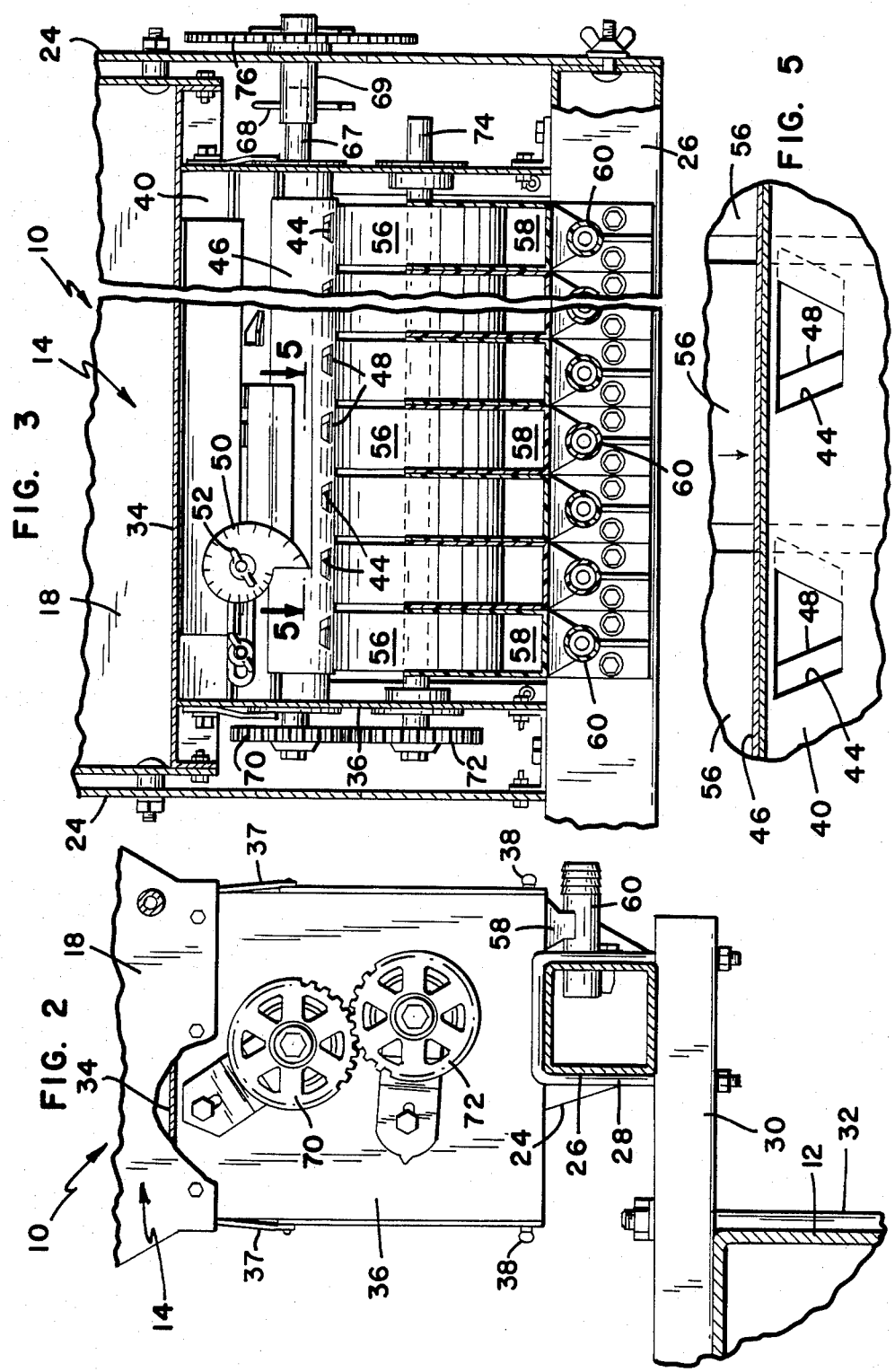

GRANULAR MATERIAL APPLICATOR WITH SPEED COMPENSATOR

TECHNICAL FIELD

The present invention relates generally to a dispenser for granular materials such as fertilizers, pesticides, and insecticides. More particularly, this invention concerns a granular applicator incorporating a speed compensator for effecting improved control and precision during distribution.

BACKGROUND ART

An important function in present day agricultural practice includes controlling weeds, insects, and other pests that are injurious to productivity and crop growth. For effective weed and pest control, a number of chemical preparations are available in dry granular form for application to the ground or to the plants. These dry granular chemicals can be applied to the soil before, during, or after planting. They can also be applied directly to the growing plants long after the planting operation.

In order to be effective, the chemical must be applied to the target in the appropriate dose. The target can be soil or plants extending across the entire field, or only across selected areas such as furrows, bands, and isolated spots. The optimum dose is one that is sufficient to cause the effect desired but no more. From the standpoint of the chemical user, that person wants to gain the maximum benefit from the minimum cost to maximize the economic gain. From the standpoint of the environment, keeping the dose as low as possible minimizes the chance of the chemical affecting nontarget organisms. In most situations, uniformly distributing the optimum dose on or in the target allows the minimum dose to have the maximum effect. If some areas of the target receive a higher than optimum dose, usually no additional benefit is gained and additional cost is incurred through waste. If some areas of the target receive a lower than optimum dose, usually the desired effect is reduced and often will not occur, the net result being lesser productivity from waste of the chemical.

Delivering the optimum dose to the target has three aspects. First, the chemical formulation, whether wet or dry, must be substantially homogeneous. Second, the proper amount of chemical must be metered to the target. Third, the metering of the chemical must be substantially uniform to achieve the desired concentration.

It will be appreciated that such chemicals are at least mildly toxic and must therefore be handled and distributed with care. Leakage of such granular chemicals from the applicator at places other than the target areas, presents a hazard to persons coming into contact with such chemicals until such time as the chemicals are incorporated into the soil, absorbed by the plants, or otherwise rendered harmless. This is another reason why precise metering and control of the chemicals are desirable.

A variety of applicators for this purpose have been available heretofore. Such applicators are usually provided with metering apertures at the bottom of a hopper through which material is discharged by means of gravity and a feed rotor located inside the hopper above the apertures. U.S. Pat. No. 3,776,430 to the assignee hereof shows one such prior device. U.S. Pat. Nos. 3,128,921 to Henderson and 2,784,881 to Hines are also representative of the prior art in this regard. The Henderson and Hines patents disclose applicators which feed the material from the hoppers onto discharge rolls. The feed rotors are connected to their respective discharge rolls for rotation in opposite directions.

In many of the prior applicators, feeding of the granular material is stopped both by closing the metering apertures and by arresting rotation of the feed rotor to prevent undue agitation and thus damage to the material which would otherwise occur during rotation of the feed rotor while the apertures are closed. When transporting the device from one field to another, the common practice heretofore has been to disconnect the feed rotor from its drive mechanism without closing the discharge or metering apertures, however, this still results in leakage, waste and thus expense.

There is thus a need for an improved applicator which incorporates a speed compensator to effect better control of the material being discharged.

SUMMARY OF INVENTION

The present invention comprises an applicator with a speed compensator which overcomes the foregoing and other difficulties associated with the prior art. In accordance with the invention, there is provided an applicator for mounting on a planter or other implement which is typically towed or driven across a field. The applicator comprises a hopper including an open top and a closed arcuate bottom which is preferably inclined at a predetermined angle off vertical. A feed rotor is disposed within the hopper bottom. A plurality of openings of predetermined shapes are provided at laterally spaced apart intervals across the bottom of the hopper. The lowermost edges of the openings are preferably straight and parallel to the rotational axis of the feed rotor. A slideable gate plate with similar openings is preferably attached to the outside of the hopper bottom to define adjustable discharge openings. Disposed immediately beneath the hopper is a revolving transfer means, including individual rollers in the preferred embodiment, which are positioned in closely spaced, near tangential contact with the discharge openings in the hopper bottom. The rotational axes of the feed rotor and revolving transfer means are parallel, vertically spaced apart and preferably laterally spaced apart. The revolving transfer means and feed rotor are interconnected for simultaneous counterrotation responsive to a travel of the implement over the ground. As the feed rotor turns, granular material is discharged through the openings in the hopper bottom onto the revolving transfer means for distribution to the points of application.

BRIEF DESCRIPTION OF DRAWINGS

A better understanding of the invention can be had by reference to the following Detailed Description in conjunction with the accompanying Drawings, wherein:

FIG. 2 is a section view taken along lines 2—2 of FIG. 1 in the direction of the arrows;

FIG. 3 is an enlarged side view of the applicator herein, with certain portions cut away for clarity;

FIG. 5 is an enlarged partial sectional view taken along lines 5—5 of FIG. 3 in the direction of the arrows.

DETAILED DESCRIPTION

Figure 1:
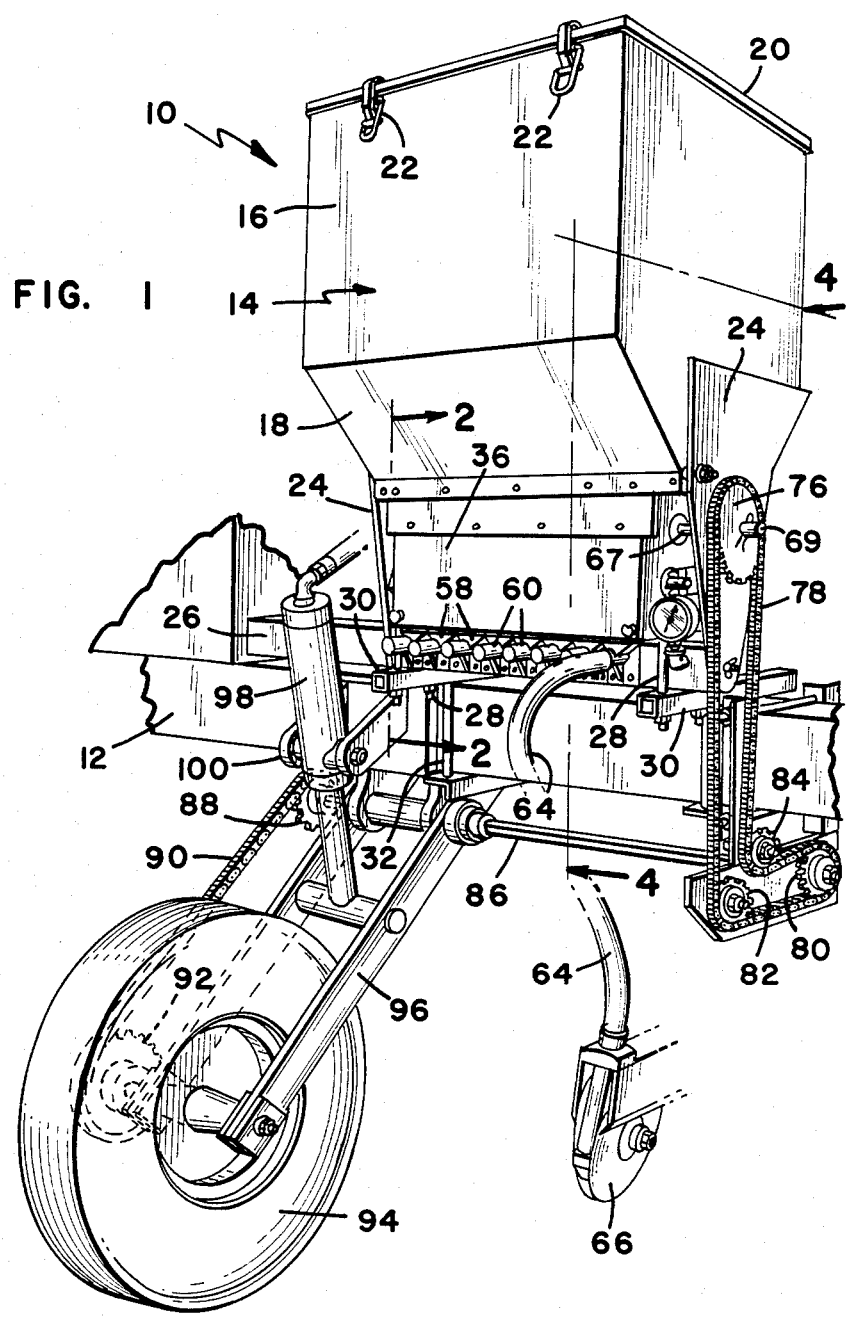
FIG. 1 is a perspective view of the applicator of the invention mounted on an agricultural implement.

Referring now to the Drawings, wherein like reference numerals designate corresponding elements throughout the views, and particularly referring to FIG. 1, there is shown the spreader or applicator 10 comprising the invention. The applicator 10 is shown mounted on an implement 12, such as a seeder or the like drawn across a field by a tractor (not shown). Although the applicator 10 is shown mounted on a seeder 12, it will be understood that the applicator can be mounted on virtually any type of suitable implement or vehicle which is either towed or driven across a field to distribute granular material. As will be explained more fully hereinafter, the applicator 10 incorporates a unique speed compensator structure to effect precise distribution of desired amounts of pesticide, insecticide, fertilizer or other granular materials.

The applicator 10 includes a hopper 14 with an open rectangular upper end 16 and a converging lower end 18. A hinged cover 20 is mounted on the upper end 16 of the hopper 14 so that the granular materials to be spread can be loaded into the hopper. The cover 20 is secured in the closed position by means of latches 22 or other suitable releaseable fasteners.

Figure 4:
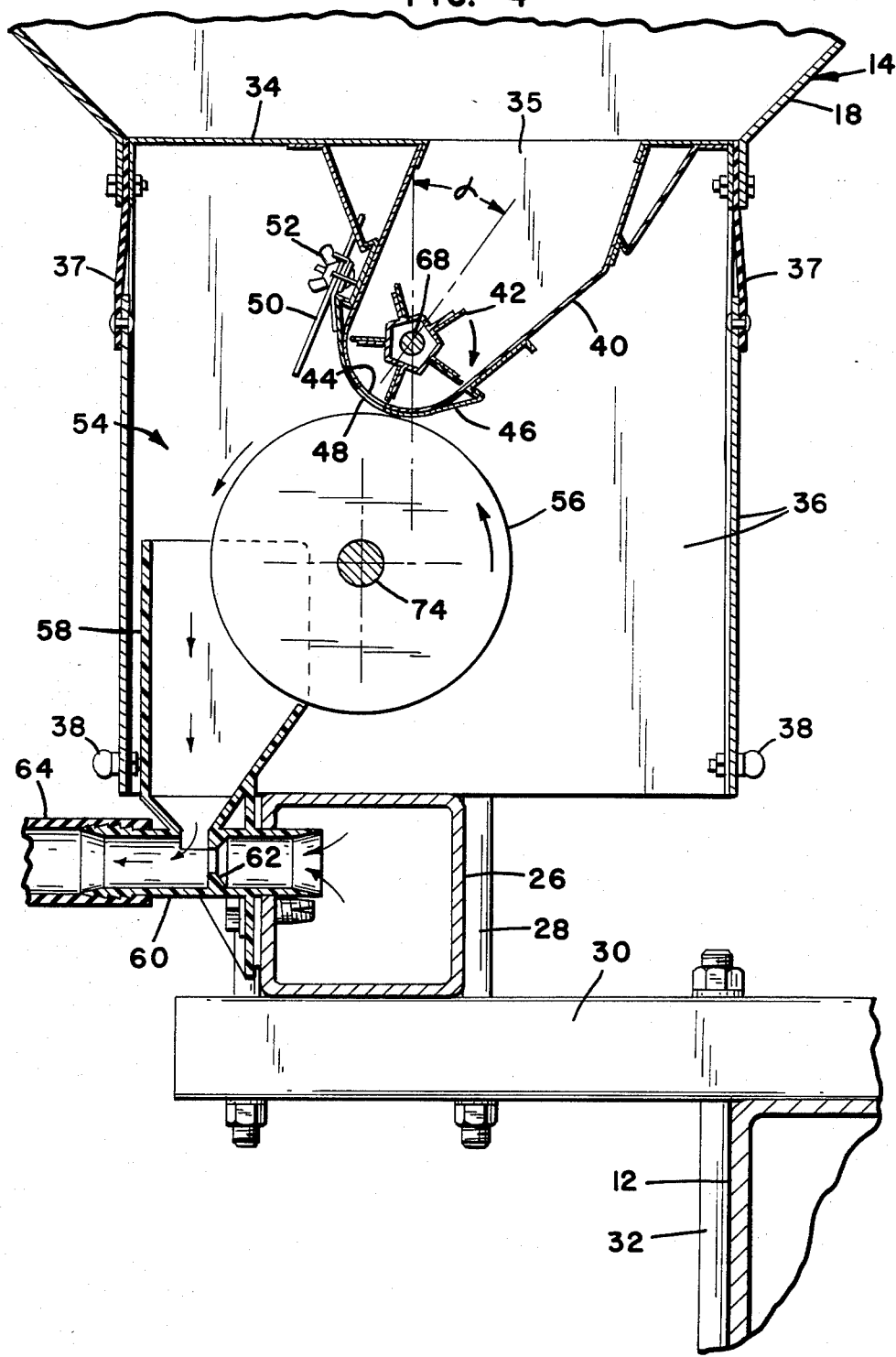
FIG. 4 is an enlarged sectional view taken along lines 4—4 of FIG. 1 in the direction of the arrows.

The lower end 18 of the hopper 14 is secured between a pair of sideplates 24, the lower ends of which are fixed to a hollow beam 26 defining an air chamber as will be explained more fully hereinbelow. The crossbeam 26 is secured by a pair of u-clamps 28 to a pair of arms 30 which in turn are secured to the implement 12 by means of u-clamps 32 as is best seen in FIG. 4. It will thus be appreciated that the applicator 10 is securely mounted on the implement 12, such as by means of suitable releaseable fasteners such as u-bolts and nuts. This type of mounting is desirable so that the applicator 10 can be easily mounted on a variety of implements.

Referring now to FIGS. 2 through 4, the converging lower end 18 of the hopper 14 includes a flat bottom wall 34 having a rectangular opening 35 therein. A box 36 is secured to the bottom end 18 of the hopper 14. Box 36 includes side panels which are supported at the top by resilient strips 37 for hinged movement, and secured at the bottom by releasable fasteners 38 for access to the interior.

A hopper bottom extension 40 is located inside the box 36 and secured beneath the bottom wall 34 and opening 35. The extension 40 includes a pair of converging sides joined by an arcuate end. A feed rotor 42 is located inside the hopper bottom extension 40 at substantially the center of the radius of curvature of the extension's arcuate end. A row of spaced apart discharge openings 44 are provided across the arcuate end of the extension 40, which is preferably inclined off vertical at a predetermined angle alpha ($\alpha$). For example, the radius of curvature of the arcuate end of extension 40 can be about one inch, with the angle of inclination alpha ($\alpha$) being about 36 degrees. It will thus be appreciated that an inclined hopper bottom extension 40 having an arcuate end with discharge openings 44 thereacross and a feed rotor 42 therein is secured to the bottom of hopper 14.

Referring now to FIGS. 3 through 5, a gateplate 46 is preferably provided for sliding movement across the outer surface of the arcuate end of the hopper bottom extension 40. The slideable gateplate 46 includes a row of spaced apart openings 48 thereacross for registry with the openings 44 in the hopper bottom extension 40. The openings 44 and 48 are of similar shape and define a row of adjustable composite discharge openings across the bottom of hopper 14.

In accordance with the preferred construction of applicator 10, the lowermost edges of openings 44 and 48 are straight and extend in a transverse direction across the end of hopper bottom extension 40 substantially parallel to the rotational axis of the feed rotor 42. The lowermost edges of openings 44 and 48 are those past which the feed rotor 42 passes first which are closest to multiple feed rollers 56. As is best seen in FIG. 5, the openings 44 and 48 in the preferred embodiment are shown as being of trapezoidal configuration, however, it will be appreciated that openings of rectangular, parallelogram, semicircular, or triangular shape can also be utilized provided that the lowermost edges or sides are substantially straight and parallel with the rotational axis of rotor 42. The straight lowermost edges of openings 44 and 48 comprises an important feature of the invention.

An adjustable cam gauge 50 is connected between the hopper bottom extension 40 and gateplate 46 in order to facilitate lateral positioning of the gateplate so that the openings 44 and 48 define composite openings of the appropriate size for the particular flow rate of granular material desired. The cam gauge 50 is secured in place with a wing nut 52 in order to set the gateplate 46 in the desired position.

Applicator 10 further includes a revolving transfer assembly 54. In the preferred embodiment, one feed roller 56 and associated cup or mixing chamber 58 are provided for each corresponding pair of openings 44 and 48 in order to define a plurality of discrete streams of granular materials for distribution. Although the preferred embodiment of the invention incorporates multiple feed rollers 56, it will be understood that multiple endless belts for each pair of openings, or rollers or endless belts for more than one pair of openings could also be utilized and that such structure is considered the full equivalent of the particular arrangement disclosed herein.

In accordance with the preferred construction, multiple feed rollers 56 are mounted for rotation about an axis which is vertically and laterally offset from the rotational axis of the feed rotor 42 so that the outer surfaces of the rollers are in closely spaced, near tangential contacting relationship with the hopper bottom extension 40 such that the lowermost edges of the associated pair of openings 44 and 48 are slightly offset or at the tops of the rollers as shown in FIG. 4. For example, spacing of about 0.027 inch between the gateplate 46 and multiple feed rollers 56 has been found suitable for purposes of receiving granular material from openings 44 and 48 with minimum spillage. This also comprises an important feature of the invention. Material deposited onto each multiple feed roller 56 is then carried around and dropped into the associated cup or mixing chamber 58 for distribution and final application. It will thus be appreciated that the revolving transfer assembly 54 functions to carry the metered streams of material from the hopper 14 into the mixing chambers 58.

The mixing chambers 58 are notched at their upper ends to receive portions of the feed rollers 56. Each mixing chamber 58 takes the general form of a cup which converges and opens at the bottom into a nozzle 60. The nozzles 60 are mounted along the hollow beam 26 and are open at their inner ends to the interior of the beam. The hollow beam 26 is connected to a source of pressure (not shown) so that its interior is pressurized. A restriction 62 is provided in each nozzle 60 between beam 26 and the lower ends of the mixing chambers 58 in order to create a venturi effect past the lower end of the mixing chambers thereby entraining the granular material and carrying it down through pneumatic delivery tubes 64 on the nozzles to the points of application. As is best seen in FIG. 1, the terminal end of each tube 64 can be connected to a pair of discs 66 for incorporation into the soil, or to a deflector for broadcast application.

Referring again to FIG. 1 in conjunction with FIGS. 2 and 3, the feed rotor 42 and rollers 56 are driven in opposite directions responsive to movement of the implement 12 such that the rate of application of granular material is directly proportional to the speed of travel of the implement. The feed rotor 42 is secured to a shaft 67 which is journaled for rotation between the ends of box 36. One end of shaft 67 is releasably connected by pin 68 to an extension shaft 69 extending beyond the associated sideplate 24. Secured to the other end of the shaft 67 is a gear 70 which is enmeshed with another gear 72 on the end of a shaft 74 supporting the feed rollers 56. Shaft 74 is also journaled for rotation between the ends of the box 36. The feed rotor 42 and rollers 56 are thus interconnected for simultaneous rotation, preferably in a 1:1 ratio, in opposite directions. The feed rotor 42 turns clockwise while the feed rollers 56 turn counterclockwise as indicated by the arrows in FIG. 4.

A sprocket 76 is secured to the outside end of shaft 69. Sprocket 76 is connected by chain 78, drive sprocket 80 and idlers 82 and 84 to a cross shaft 86 which is part of implement 12. Another drive sprocket 88 is secured to the opposite end of the cross shaft 86. The sprocket 88 is connected by a chain 90 to a sprocket 92 secured to a ground engaging wheel 94 carried between a pair of pivotal arms 96. As illustrated, the pivot points of arms 96 are coincidental with the rotational axis of the cross shaft 86. A double acting cylinder 98 is coupled between a bracket 100 on the implement 12 and the pivot arms 96 so that the implement can be lifted or lowered relative to the ground. It will thus be apparent that the feed rotor 42 and feed rollers 56 are mechanically driven at a rate and direction directly proportional to travel of implement 12 over the ground.

The applicator 10 of the invention operates as follows. Assume that the hopper 14 is at least partially filled with fertilizer, herbicide, pesticide or other granular material to be applied to the soil or plants. The wheel 94 is in contact with the ground. As the implement 12 moves forward, the wheel 94 turns and thus drives the feed rotor 42 in a clockwise direction sweeping upwardly past the openings 44, while the transfer means 54 is simultaneously driven in a counterclockwise direction revolving past openings 48. Material urged through openings 44 and 48 is deposited onto the transfer means 54 and carried thereby into the mixing chambers 58 where it falls downwardly for distribution, being expelled by air pressure out nozzles 60 and through tubes 64 to the final points of application. Material is thus urged toward and away from the openings 44 and 48 at the same rate, which is directly proportional to travel of the implement 12. When the implement 12 stops or wheel 94 is disengaged or out of ground contact, residual material accumulates on the transfer means 54 but only until openings 44 and 48 are effectively filled and blocked. If the implement 12 moves backward, rotor 42 and the transfer means 54 turn the other way such that little if any material is spilled or wasted. This is by reason of the configuration of openings 44 and 48, the inclination of the hopper bottom extension 40, and the offset and close proximity between the transfer means 54 and the hopper bottom extension. These factors combine to facilitate more precise application of materials at a rate directly proportional to travel of the implement across the field and with minimum waste and spillage.

The applicator 10 herein is capable of uniformly applying granular material at rates between about 1 pound and 40 pounds per acre of soil surface. For example, satisfactory results have been obtained with a feed rotor of about 2 inch diameter, an angle of inclination ($\alpha$) of the hopper bottom extension of between about zero and 36 degrees, transfer rollers of between about 2.0 and 4.6 inch diameters, lateral offsets between the vertical planes of the rotational axes of the feed rotors and transfer rollers of between zero and 1.0 inch, rotor to roller gear ratios ranging between about 1:1 and 3:2, and material discharge openings of trapezoidal, semicircular, and triangular configurations.

From the foregoing, it will thus be apparent that the present invention comprises an improved spreader or applicator for granular materials which incorporates several advantages over the prior art. One significant aspect involves the use of an inclined hopper bottom extension having an arcuate end with a row of openings therein with straight lowermost edges. Another significant aspect involves the use of a revolving transfer means which carries material away from the hopper at a rate proportional to speed of travel when the implement is moving forward, but which allows a small amount of material to accumulate and block further flow when the implement is stationary or when application is not desired. When the implement is moving backward and the transfer means is not disengaged, little or no spillage occurs. Other advantages will be evident to those skilled in the art.

Although particular embodiments of the invention have been illustrated in the accompanying Drawings and described in the foregoing Detailed Description, it will be understood that the invention is not limited to these particular embodiments, but is intended to embrace any equivalents, alternatives, modifications and rearrangements of elements falling within the scope of the invention as defined by the following claims.

I claim:

1. An applicator for granular materials, comprising:
    a hopper having a closed arcuate bottom end oriented at a predetermined acute angle of inclination off vertical with a plurality of laterally spaced-apart openings therein;
    an adjustable gateplate mounted on the bottom end of said hopper, said gateplate having a plurality of similar laterally spaced-apart openings therein for registry with the openings in said hopper to form adjustable composite material discharge openings;
    a feed rotor mounted for rotation about a transverse axis within the bottom end of said hopper;
    the openings in said hopper and said gateplate each including a substantially straight lowermost edge substantially parallel to the rotational axis of said feed rotor;
    revolving transfer means having an uppermost portion located beneath and closely adjacent to the bottom end of said hopper near the lowermost edges of the discharge openings for receiving material urged through the discharge openings by said feed rotor;

means underlying a portion of said revolving tranfer means opposite said hopper bottom for receiving material from said transfer means and distributing the material for application; and means for effecting rotation of said feed rotor and transfer means in opposite directions responsive to travel of the applicator so that material is fed through the discharge openings by said feed rotor onto said revolving transfer means for transfer.

2. The applicator of claim 1, wherein said feed rotor is substantially concentric with the arcuate bottom end of said hopper 3. The applicator of claim 1, wherein said revolving transfer means comprises at least one roller mounted for rotation about an axis substantially parallel with the rotational axis of said feed rotor.

4. The applicator of claim 1, wherein said material receiving and distributing means comprises:
an upright receiver with an open top end underlying a portion of said revolving transfer means; and
a nozzle connected to the lower end of said receiver and adapted for connection to a source of pressure.

5. The applicator of claim 1, wherein said means for effecting rotation of said feed rotor and transfer means comprises:
a rotatable wheel in engagement with the ground; and
means for drivingly connecting said wheel with said feed rotor and transfer means.

6. The applicator of claim 1, wherein the rotational axes of said revolving transfer means and feed rotor lie in vertical planes which are laterally offset by a predetermined distance.

7. The applicator of claim 1, wherein said feed rotor and transfer rollers are interconnected in a drive ratio of about 1:1.

8. Apparatus for applying granular materials, which comprises:
a hopper having a closed arcuate bottom end with a plurality of laterally spaced-apart predetermined discharge openings therein, the arcuate bottom end of said hopper being oriented at a predetermined acute angle of inclination off vertical;
an adjustable gateplate mounted on the bottom end of said hopper, said gateplate having a plurality of similar laterally spaced-apart openings therein for registry with the openings in said hopper to form adjustable composite material discharge openings;
a feed rotor mounted for rotation inside the bottom end of said hopper;
the openings in said hopper and said gateplate including substantially straight, lowermost edges oriented substantially parallel to the rotational axis of said feed rotor;
a plurality of transfer rollers mounted for rotation beneath and having uppermost portions located closely adjacent to the bottom end of said hopper near the lowermost edges of the discharge openings for receiving material urged through the opening by said feed rotor, said transfer rollers and feed rotor being rotatable about substantially parallel transverse axes;

means underlying a portion of said rollers opposite said hopper bottom for receiving material from said transfer rollers and distributing the material for application; and means for effecting rotation of said feed rotor and transfer rollers in opposite directions responsive to travel of the applicator so that material is fed through the discharge opening by said feed rotor onto said revolving transfer means for transfer.

9. The apparatus of claim 8, wherein said feed rotor is substantially concentric with the arcuate bottom end of said hopper, and wherein the angle of inclination of the bottom end of said hopper is an acute angle off vertical.

10. The applicator of claim 8, wherein said material receiving and distributing means comprises:
an upright receiver with an open top end underlying a portion of each transfer roller;
a nozzle connected to the lower end of said receiver and adapted for connection to a source of pressure; and a tube connected to said nozzle.

11. The applicator of claim 8, wherein said means for effecting rotation of said feed rotor and transfer means comprises:
a rotatable wheel in engagement with the ground; and
means for drivingly connecting said wheel with said feed rotor and transfer means.

12. An applicator for granular material such as herbicides, pesticides and the like, comprising:
a hopper having an arcuate bottom end;
a gateplate mounted for movement on the bottom end of said hopper, said gateplate and bottom end of said hopper each having a plurality of laterally spaced-apart predetermined material discharge openings therein;
means for adjustably securing said gateplate in position on the bottom end of said hopper;
a feed rotor mounted for substantially concentric rotation within the arcuate end of said hopper;
a plurality of transfer rollers disposed immediately beneath and closely adjacent to the bottom end of said hopper for directly receiving material urged through the openings by said feed rotor, said rollers and feed rotor being rotatable about substantially parallel transverse axes;
the openings in said hopper and gateplate including substantially straight lowermost edges which are positioned closest to the uppermost portions of said transfer rollers and which extend substantially parallel to the rotational axes of said feed rotor and transfer rollers;
means for effecting rotation of said feed rotor and transfer rollers in opposite directions responsive to travel of the applicator;
a plurality of receivers each having an open top portion and a lower nozzle portion, the top portions of said receivers underlying portions of the corresponding transfer rollers opposite said hopper;
one side of the nozzle portions of said receivers being connected to a source of fluid pressure; and
tubes connected to the other sides of the nozzle portions of said receivers for delivering the granular material to predetermined points of application.

* * * * *